(12) United States Patent
Ishii et al.

(10) Patent No.: US 11,980,914 B2
(45) Date of Patent: May 14, 2024

(54) VIBRATING DEVICE AND OPTICAL DETECTION APPARATUS

(71) Applicant: Murata Manufacturing Co., Ltd., Nagaokakyo (JP)

(72) Inventors: Yuuki Ishii, Nagaokakyo (JP); Hitoshi Sakaguchi, Nagaokakyo (JP); Katsumi Fujimoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 773 days.

(21) Appl. No.: 17/108,031

(22) Filed: Dec. 1, 2020

(65) Prior Publication Data

US 2021/0078043 A1  Mar. 18, 2021

Related U.S. Application Data

(63) Continuation of application No. PCT/JP2019/015980, filed on Apr. 12, 2019.

(30) Foreign Application Priority Data

Sep. 28, 2018  (JP) ................. 2018-183412

(51) Int. Cl.
*B06B 1/06* (2006.01)
*G03B 11/04* (2021.01)
(Continued)

(52) U.S. Cl.
CPC ............ *B06B 1/0651* (2013.01); *G03B 11/04* (2013.01); *G03B 17/08* (2013.01); *G03B 17/56* (2013.01)

(58) Field of Classification Search
CPC ....... B06B 1/0651; G03B 11/04; G03B 17/08; G03B 17/56
See application file for complete search history.

(56) References Cited

U.S. PATENT DOCUMENTS 11,012,597 B2 * 5/2021 Fujimoto ............... G03B 17/00
11,433,426 B2 * 9/2022 Fujimoto ........... G02B 27/0006
(Continued)

FOREIGN PATENT DOCUMENTS

JP  62-254667 A    11/1987
JP  2004141769 A *  5/2004
(Continued)

OTHER PUBLICATIONS

Official Communication issued in International Patent Application No. PCT/JP2019/015980, mailed on Jul. 2, 2019.
(Continued)

*Primary Examiner* — J. San Martin
(74) *Attorney, Agent, or Firm* — Keating & Bennett, LLP

(57) ABSTRACT

A vibrating device includes a vibrating element, a support, and a connector. The vibrating element includes a vibrating body that is tubular and includes a first opening end surface and a second opening end surface. The support extends in an axial direction and supports the vibrating body, the axial direction being a direction connecting the first opening end surface and the second opening end surface of the vibrating body. The connector connects the vibrating body and the support to each other. The vibrating body vibrates in a breathing vibration mode to generate a first node and a second node on the vibrating element at different positions in the axial direction. The connector is positioned between the first node and the second node.

18 Claims, 11 Drawing Sheets

(51) Int. Cl.
    *G03B 17/08*     (2021.01)
    *G03B 17/56*     (2021.01)

(56) References Cited

U.S. PATENT DOCUMENTS

| 11,511,322 | B2* | 11/2022 | Ichiguchi | H04N 23/811 |
|---|---|---|---|---|
| 2018/0095272 | A1* | 4/2018 | Fujimoto | G03B 17/56 |
| 2018/0210194 | A1* | 7/2018 | Nishiyama | G03B 17/08 |
| 2018/0239218 | A1* | 8/2018 | Ikeuchi | G03B 17/08 |
| 2018/0292646 | A1 | 10/2018 | Fujimoto et al. | |
| 2019/0151897 | A1 | 5/2019 | Fujimoto et al. | |
| 2019/0176195 | A1* | 6/2019 | Fujimoto | G03B 17/08 |
| 2020/0057301 | A1* | 2/2020 | Kuratani | G03B 17/08 |
| 2020/0338607 | A1* | 10/2020 | Kitamori | B08B 7/04 |
| 2020/0379320 | A1* | 12/2020 | Fujimoto | G02B 27/0006 |
| 2021/0080714 | A1* | 3/2021 | Ishii | G03B 17/56 |
| 2021/0154702 | A1* | 5/2021 | Fujimoto | G03B 17/08 |
| 2021/0302723 | A1* | 9/2021 | Fujimoto | B06B 1/0207 |

FOREIGN PATENT DOCUMENTS

| JP | 2017-170303 | A | 9/2017 |
|---|---|---|---|
| WO | 2017/149933 | A1 | 9/2017 |
| WO | 2018/100796 | A1 | 6/2018 |

OTHER PUBLICATIONS

Official Communication issued in corresponding European Patent Application No. 19867596.9, mailed on May 19, 2022.

* cited by examiner

VIBRATING DEVICE AND OPTICAL DETECTION APPARATUS

CROSS REFERENCE TO RELATED APPLICATIONS

This application claims the benefit of priority to Japanese Patent Application No. 2018-183412 filed on Sep. 28, 2018 and is a Continuation Application of PCT Application No. PCT/JP2019/015980 filed on Apr. 12, 2019. The entire contents of each application are hereby incorporated herein by reference.

BACKGROUND OF THE INVENTION

1. Field of the Invention

The present invention relates to a vibrating device and an optical detection apparatus.

2. Description of the Related Art

Vibrating devices have been used in various applications, for example, as a device for removing raindrops or the like that have adhered to an optical detection apparatus serving as a surveillance apparatus, or as an acoustic device. When in use, the vibrating device is fixed to, for example, an external device. To reduce leakage or damping of vibration, the vibrating device is often fixed to an external object at a node.

Japanese Unexamined Patent Application Publication No. 62-254667 describes an example of a support structure of a piezoelectric vibrator. This support structure includes a cylindrical support provided on a lateral surface of a cylindrical piezoelectric vibrator that vibrates in a breathing vibration mode. The support has a length of λ (2n+1)/4 so that the support has a node at an end thereof, and the end of the support is fixed to an external object.

Since no displacement occurs at the node during vibration, leakage and damping of the vibration can be prevented when the vibrating device is supported at the node. However, in practice, it is very difficult to accurately support the vibrating device at the node. Therefore, in practice, the vibrating device is supported at a position near the node. Displacement that occurs during the vibration increases with increasing distance from the node. Therefore, when the vibrating device is supported at a position shifted from the node, leakage of the vibration from a portion that supports the vibrating device and damping of the vibration cannot be easily reduced.

During the vibration in the breathing vibration mode, a portion around the node receives rotation moment about the node. Therefore, even when the end of the support, at which the node exists, is connected to the external object as described in Japanese Unexamined Patent Application Publication No. 62-254667, the rotation moment about the node is also applied to the external object. Therefore, it is difficult to sufficiently reduce leakage and damping of the vibration.

SUMMARY OF THE INVENTION

Preferred embodiments of the present invention provide vibrating devices and optical detection apparatuses each achieving reduced leakage and damping of vibration.

A vibrating device according to a preferred embodiment of the present invention includes a vibrating element, a support, and a connector. The vibrating element includes a vibrating body that is tubular and includes a first opening end surface and a second opening end surface. The support extends in an axial direction and supports the vibrating body, the axial direction being a direction connecting the first opening end surface and the second opening end surface of the vibrating body. The connector connects the vibrating body and the support to each other. The vibrating body vibrates in a breathing vibration mode to generate a first node and a second node on the vibrating element at different positions in the axial direction. The connector is positioned between the first node and the second node.

An optical detection apparatus according to a preferred embodiment of the present invention includes the vibrating device structured in accordance with another preferred embodiment of the present invention and an optical detection element are structured with the lid body of the vibrating device covering a detection region of the optical detection element.

According to the preferred embodiments of the present invention, vibrating devices and optical detection apparatuses each achieving reduced leakage and damping of vibration are able to be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The present invention will become clear from the following description of preferred embodiments of the present invention with reference to the accompanying drawings.

It is to be noted that each of the preferred embodiments described in this specification is illustrative, and partial replacements and combinations of the structures of different preferred embodiments are possible.

Figure 1:
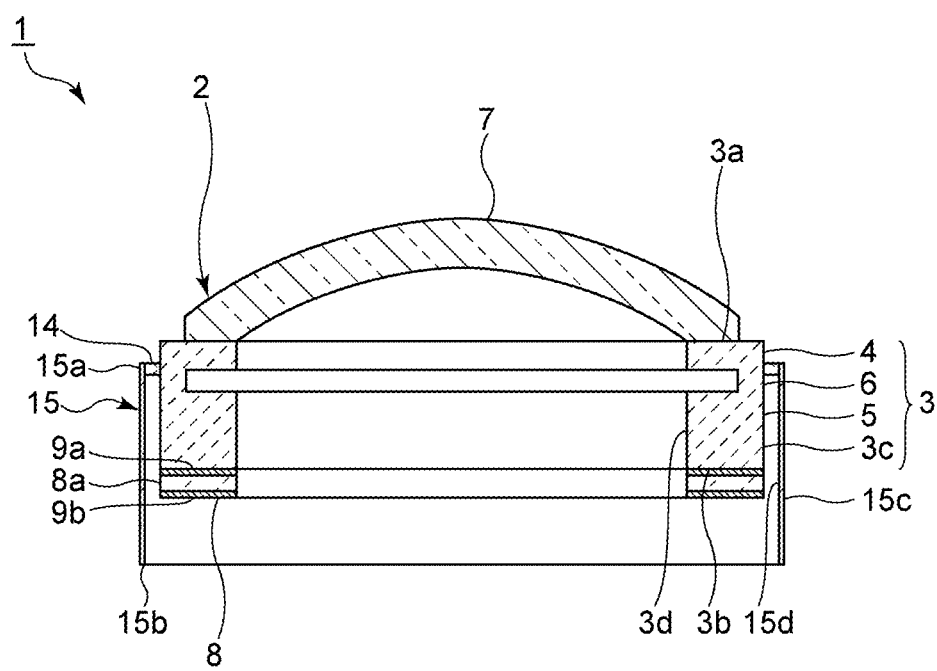
FIG. 1 is an elevational cross-sectional view of a vibrating device according to a first preferred embodiment of the present invention.
Figure 2:
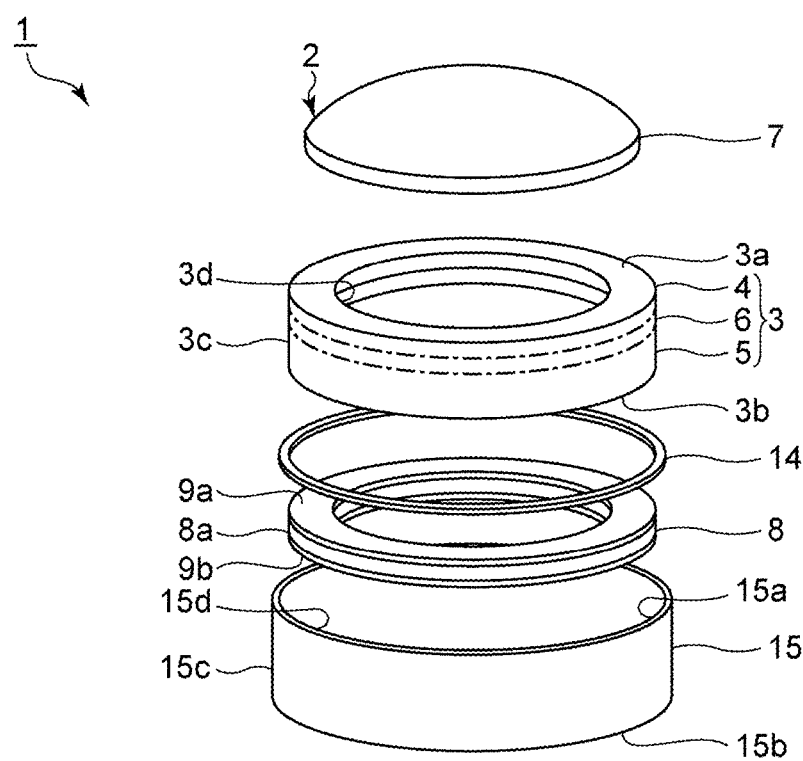
FIG. 2 is an exploded perspective view of the vibrating device according to the first preferred embodiment of the present invention.

FIG. 1 is an elevational cross-sectional view of a vibrating device according to a first preferred embodiment of the present invention. FIG. 2 is an exploded perspective view of the vibrating device according to the first preferred embodiment.

A vibrating device 1 illustrated in FIGS. 1 and 2 vibrates to remove raindrops and foreign matter from a field of view of an image pickup device by moving the raindrops and foreign matter. However, vibrating devices according to the preferred embodiments of the present invention may instead be applied, for example, to generate sound pressure in an ultrasonic wave sensor, a microphone, a buzzer, or the like.

The vibrating device 1 includes a vibrating element 2, a support 15 that supports the vibrating element 2, and a connector 14 that connects the vibrating element 2 and the support 15 to each other. More specifically, the vibrating element 2 includes a substantially cylindrical vibrating body 3. The vibrating body 3 of the vibrating element 2 and the support 15 are connected to each other by the connector 14. The vibrating device 1 has an interior space surrounded by the vibrating element 2, the connector 14, and the support 15.

Figure 3:
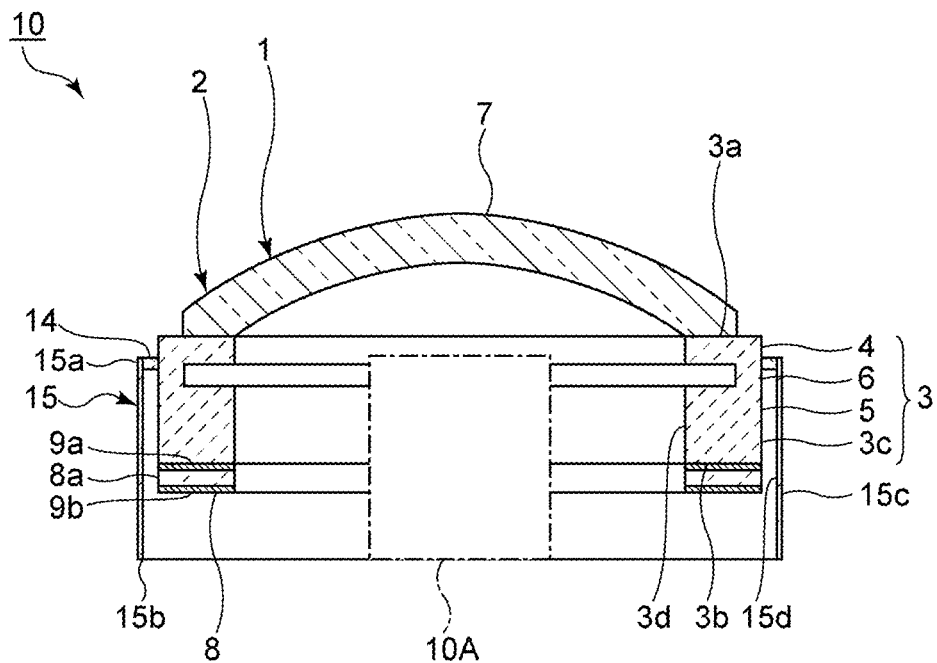
FIG. 3 is an elevational cross-sectional view of an imaging device including the vibrating device according to the first preferred embodiment of the present invention.

FIG. 3 is an elevational cross-sectional view of an imaging device including the vibrating device according to the first preferred embodiment.

An image pickup device 10A shown by the one-dot chain line is located in the interior space surrounded by the vibrating element 2, the connector 14, and the support 15. Thus, an imaging device 10 that defines and functions as an optical detection apparatus according to a preferred embodiment of the present invention is formed. The imaging device 10 includes the vibrating device 1 and the image pickup device 10A. The image pickup device 10A may be, for example, a CMOS, a CCD, a bolometer, or a thermopile, which receives light with wavelengths in the visible region or the far-infrared region. The imaging device 10 may be, for example, a camera, a radar, or a LIDAR device.

An optical detection element other than the image pickup device 10A that optically detects energy rays may instead be located in the interior space. The energy rays to be detected may be, for example, active energy rays, such as electromagnetic waves or infrared rays. The optical detection element has a detection region covered by a light transmitting body 7, which will be described below. The imaging device 10 illustrated in FIG. 3 is structured with the field of view of the image pickup device 10A covered by the light transmitting body 7. In this specification, the term "light-transmitting property" means the property of transmitting at least the energy rays or light with wavelengths to be detected by the above-described optical detection element.

The vibrating device 1 is described below.

As illustrated in FIG. 1, the vibrating element 2 includes the above-described vibrating body 3, the light transmitting body 7 that defines and functions as a lid body, and a piezoelectric vibrator 8. The vibrating body 3 has a first opening end surface 3a, a second opening end surface 3b, and an outer surface 3c and an inner surface 3d that connect the first opening end surface 3a and the second opening end surface 3b. In this specification, the direction connecting the first opening end surface 3a and the second opening end surface 3b of the vibrating body 3 is referred to as an axial direction, and a direction orthogonal to the axial direction is referred to as a radial direction.

The vibrating body 3 includes a cylindrical or substantially cylindrical first vibrating portion 4, a cylindrical or substantially cylindrical second vibrating portion 5, and an annular joining portion 6 that connects the first vibrating portion 4 and the second vibrating portion 5. The vibrating body 3 is a tubular body in which the first vibrating portion 4, the joining portion 6, and the second vibrating portion 5 are located and oriented with coinciding central axes. The first vibrating portion 4 includes the first opening end surface 3a of the vibrating body 3. The second vibrating portion 5 includes the second opening end surface 3b of the vibrating body 3. The shapes of the first vibrating portion 4, the second vibrating portion 5, and the joining portion 6 are not limited to the above-described shapes. The first vibrating portion 4, the second vibrating portion 5, and the joining portion 6 may have any shapes as long as they are able to be continuously connected to each other to define a single tubular body. The vibrating body 3 does not necessarily include the first vibrating portion 4, the second vibrating portion 5, and the joining portion 6 as long as the vibrating body 3 is tubular. The vibrating body 3 may have, for example, a substantially rectangular tubular shape.

In this specification, the terms "outer periphery" and "inner periphery" respectively mean the outer periphery and the inner periphery in plan view unless specified otherwise. The outer peripheries of the joining portion 6, the first vibrating portion 4, and the second vibrating portion 5 overlap in plan view. The inner periphery of the joining portion 6 is positioned outside the inner peripheries of the first vibrating portion 4 and the second vibrating portion 5. When a thickness in a direction orthogonal or substantially orthogonal to the axial direction is referred to as a wall thickness, the wall thickness of the joining portion 6 is less than the wall thickness of the first vibrating portion 4 and the wall thickness of the second vibrating portion 5. The inner diameter of the joining portion 6 is greater than that of other portions.

The outer surface 3c of the vibrating body 3 is formed by connecting the outer surfaces of the first vibrating portion 4, the joining portion 6, and the second vibrating portion 5. Similarly, the inner surface 3d of the vibrating body 3 is formed by connecting the inner surfaces of the first vibrating portion 4, the joining portion 6, and the second vibrating portion 5. In the present preferred embodiment, the inner surface 3d has a step at the position of the joining portion 6. The outer surface 3c has no steps.

The light transmitting body 7 is provided on the first opening end surface 3a of the vibrating body 3 to cover the opening. The light transmitting body 7 is a lid body having a light-transmitting property. Although the light transmitting body 7 has a dome shape in the present preferred embodiment, the light transmitting body 7 may instead have a flat or substantially flat plate shape. The material of the light transmitting body 7 may be, for example, a plastic having a light-transmitting property, glass, or a ceramic having a light-transmitting property.

The piezoelectric vibrator 8 is provided on the second opening end surface 3b of the vibrating body 3. The portion on which the piezoelectric vibrator 8 is provided is not limited to the above-described portion. The piezoelectric vibrator 8 includes an annular piezoelectric body 8a. The piezoelectric body 8a includes, for example, a piezoelectric ceramic, such as $Pb(Zr,Ti)O_3$ or $(K,Na)NbO_3$, or a piezoelectric single crystal, such as $LiTaO_3$ or $LiNbO_3$.

The piezoelectric vibrator 8 includes a first electrode 9a provided on one principal surface of the piezoelectric body 8a and a second electrode 9b provided on the other principal surface. The first electrode 9a and the second electrode 9b are annular and face each other. Each of the first electrode 9a and the second electrode 9b is electrically connected to an external object. Although a single annular piezoelectric vibrator 8 is provided in the present preferred embodiment, the piezoelectric vibrator 8 is not limited to this. For example, a plurality of piezoelectric vibrators with rectangular or substantially rectangular plate shapes may be provided along the outer surface 3c.

The first electrode 9a of the piezoelectric vibrator 8 is joined to the vibrating body 3. The piezoelectric vibrator 8 vibrates in a breathing vibration mode, thereby causing the vibrating body 3 to vibrate in the breathing vibration mode, and a connected body including the vibrating body 3 and the light transmitting body 7 vibrates. The breathing vibration mode is a vibration mode in which displacement occurs in the radial direction of the annular piezoelectric vibrator or the tubular vibrating body. The vibrating element 2 does not necessarily include the piezoelectric vibrator 8 as long as the vibrating element 2 includes a vibrator that causes the vibrating body 3 to vibrate in the breathing vibration mode.

The above-described connector 14, which is annular, is connected to the outer surface 3c of the vibrating body 3. More specifically, the connector 14 has an outer surface and an inner surface. The inner surface of the connector 14 is connected to the outer surface 3c of the vibrating body 3. The vibrating device 1 is structured with the connector 14 extending radially outward from the outer surface 3c of the vibrating body 3. The vibrating body 3 and the connector 14 may be formed as an integral component. The position of the connector 14 will be further described with reference to FIG. 4.

Figure 4:
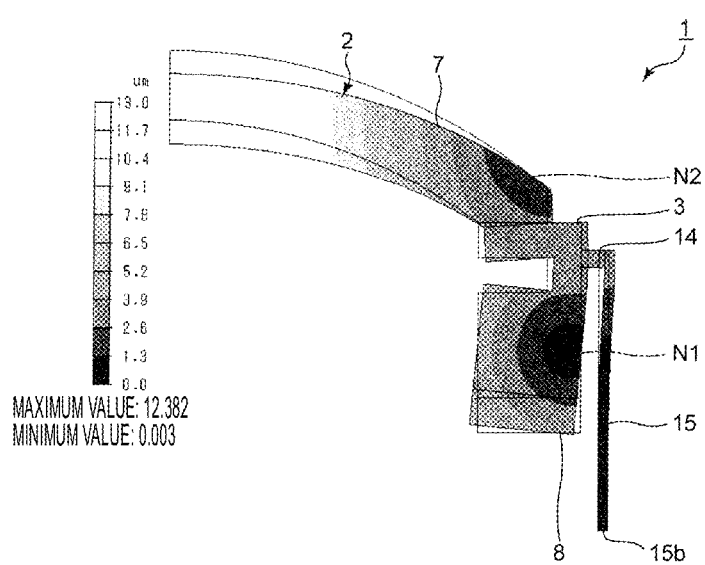
FIG. 4 illustrates vibration of the vibrating device and the position of a connector according to the first preferred embodiment of the present invention.

FIG. 4 illustrates vibration of the vibrating device and the position of the connector according to the first preferred embodiment. FIG. 4 illustrates a portion corresponding to one-half of the cross section of FIG. 1 in the radial direction.

The vibrating body 3 vibrates in the breathing vibration mode, and a first node N1 and a second node N2 are generated on the vibrating element 2 at different positions in the axial direction. More specifically, in the present preferred embodiment, the first node N1 is positioned on the vibrating body 3, and the second node N2 is positioned on the light transmitting body 7. The connector 14 is positioned between the first node N1 and the second node N2.

Although the vibrating body 3 vibrates in the breathing vibration mode to generate two nodes in the present preferred embodiment, the vibrating body 3 may instead vibrate in the breathing vibration mode to generate three or more nodes. In addition, the first node N1 and the second node N2 are nodes that are adjacent to each other.

Referring to FIG. 1 again, the above-described support 15 is connected to the outer surface of the connector 14. The support 15 includes a connecting portion 15a that is connected to the connector 14. The support 15 is connected to the vibrating body 3 by the connector 14, and supports the vibrating body 3.

The support 15 is a cylindrical or substantially cylindrical body that extends in the axial direction. The shape of the support 15 is not limited to this and may instead be, for example, a rectangular or substantially rectangular tubular shape as long as the support 15 extends in the axial direction. The support 15 has an outer surface 15c and an inner surface 15d. The connecting portion 15a is positioned near an upper end of the inner surface 15d of the support 15 in FIG. 1. The support 15 and the connector 14 may be formed as an integral component.

The support 15 includes a bottom portion 15b including a lower end of the support 15 in FIG. 1. The vibrating device 1 is fixed to an external object at the bottom portion 15b of the support 15. Alternatively, a bottom plate may be joined to the bottom portion 15b to define a sealed space by the vibrating element 2, the connector 14, the support 15, and the bottom plate.

The present preferred embodiment is characterized in that the vibrating body 3 vibrates in the breathing vibration mode to generate the first node and the second node on the vibrating element 2 at different positions in the axial direction and that the connector 14 that connects the vibrating body 3 and the support 15 to each other is positioned between the first node and the second node. As a result, leakage of the vibration to the bottom portion 15b of the support 15 does not easily occur. Therefore, when the vibrating device 1 is fixed to an external object, damping of the vibration of the vibrating device 1 does not easily occur.

Figure 5:
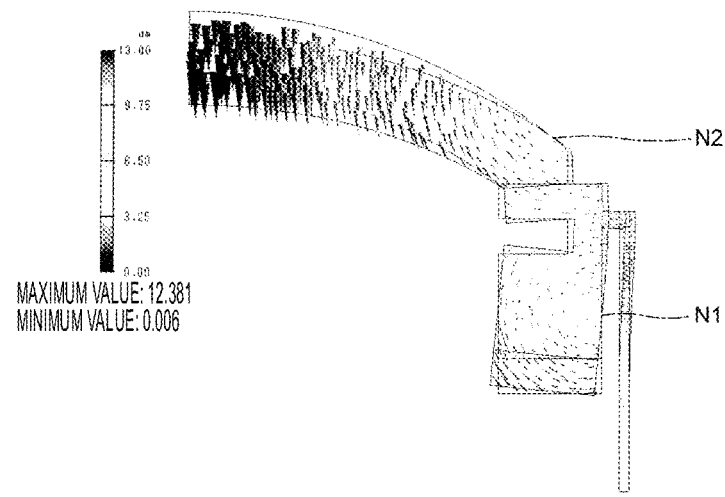
FIG. 5 is an element vector diagram illustrating the vibration of the vibrating device according to the first preferred embodiment of the present invention.

FIG. 5 is an element vector diagram illustrating the vibration of the vibrating device according to the first preferred embodiment. FIG. 5 illustrates the same portion as that illustrated in FIG. 4.

As illustrated in FIG. 5, the vibration of the vibrating element 2 involves rotation moment in regions around the first node N1 and the second node N2. Therefore, the vibration of the vibrating element 2 includes components in the radial and axial directions. In the present preferred embodiment, the connector 14 is located at a position at which the vibrational displacement in the axial direction is about 0 μm. In this specification, displacements are expressed as absolute values unless specified otherwise.

Figure 6:
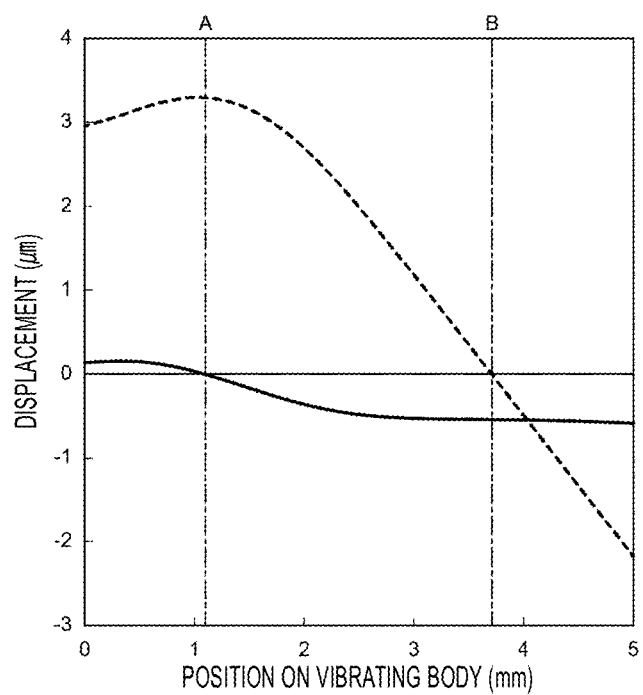
FIG. 6 is a graph showing the vibrational displacement in radial and axial directions at each position on the vibrating body according to the first preferred embodiment of the present invention.

FIG. 6 is a graph showing the vibrational displacement in the radial and axial directions at each position on the vibrating body according to the first preferred embodiment. In FIG. 6, the horizontal axis represents the position on the vibrating body in the axial direction. The value 0 mm on the horizontal axis represents the position of the first opening end surface of the vibrating body. In FIG. 6, the solid line shows the displacement in the axial direction, and the dashed line shows the displacement in the radial direction. The one-dot chain line A shows the position at which the connector is located, and the one-dot chain line B shows the position of the first node.

As illustrated in FIG. 6, at the position at which the connector 14 is located, the vibrational displacement in the axial direction is about 0 μm and the vibrational displacement in the radial direction is about 3.3 μm. In contrast, at the position of the first node, the vibrational displacement in the radial direction is about 0 μm and the vibrational displacement in the axial direction is about 0.5 μm.

A vibrating device having the structure of the first preferred embodiment and a vibrating device of a comparative example including a connector located at the position of the first node were prepared. Then, the vibrating device of the first preferred embodiment and the vibrating device of the comparative example were compared for the displacement of the bottom portion of the support. The comparison was carried out based on the displacement provided by combining components in the radial and axial directions.

According to the comparative example, the displacement of the bottom portion of the support was about 2.4 μm. In contrast, according to the first preferred embodiment, the displacement of the bottom portion of the support was about 0.2 μm. This shows that, according to the first preferred embodiment, leakage of the vibration of the vibrating element to the bottom portion of the support is able to be significantly reduced.

When the vibrating body vibrates in the breathing vibration mode, portions around the nodes receive rotation moment about the nodes. Therefore, when the connector is connected to the vibrating body at the position of the first node as in the comparative example, the connector receives rotation moment. In the comparative example, the position of the connector in the axial direction is the same or substantially the same as the position of the node in the axial direction. Therefore, the vibration that leaks to the connector due to the rotation moment has a small displacement in the width direction but has a large displacement in the axial direction. When the vibration that has leaked to the support through the connector has a large displacement in the axial direction, displacement of the bottom portion of the support that extends in the axial direction is also large. Therefore, it is difficult to reduce leakage of the vibration to the bottom portion of the support. In addition, when the vibrating device is fixed to an external object at the bottom portion of the support, vibration of the bottom portion is restrained. Therefore, it is also difficult to reduce damping of the vibration.

In contrast, according to the first preferred embodiment illustrated in FIG. 4, the connector 14 is positioned between the first node N1 and the second node N2. The rotation moment about the first node N1 and the rotation moment about second node N2 are combined in a region between the first node N1 and the second node N2, and therefore the displacement in the axial direction is reduced. Accordingly, the vibrational displacement of the connector 14 in the axial direction is able to be significantly reduced. Even when the vibration in the radial direction is transmitted to the support 15 that extends in the axial direction, displacement of the bottom portion 15b of the support 15 does not easily occur. Therefore, leakage of the vibration of the vibrating element 2 to the bottom portion 15b of the support 15 is able to be significantly reduced. In addition, since the displacement of the bottom portion 15b is very small, when the bottom portion 15b is fixed to an external object, damping of the vibration does not easily occur.

The vibrational displacement of the vibrating body 3 in the axial direction at a position at which the connector 14 is connected is preferably less than or equal to about 90%, more preferably less than or equal to about 40%, of the vibrational displacement of the vibrating body 3 in the axial direction at the position of the first node N1, for example. Still more preferably, the displacement in the axial direction is about 0 μm, for example. Accordingly, leakage and damping of the vibration are able to be further significantly reduced. This will be further described with reference to FIG. 7.

Figure 7:
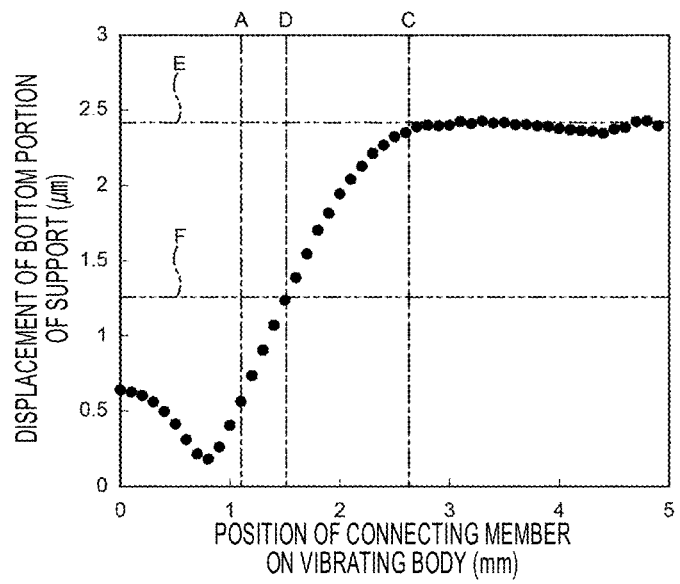
FIG. 7 is a graph showing the relationship between the position of the connector on a support and the displacement of a bottom portion of the support.

FIG. 7 is a graph showing the relationship between the position of the connector on the support and the displacement of the bottom portion of the support. The relationship shown in FIG. 7 is provided by using the vibrating element, the connector, and the support according to the first preferred embodiment and changing the position of the connector. In FIG. 7, the horizontal axis represents the position of the connector on the vibrating body in the axial direction. The value 0 mm on the horizontal axis represents the position of the first opening end surface of the vibrating body.

In FIG. 7, the one-dot chain line A shows the position at which the connector is located in the first preferred embodiment. The one-dot chain line C shows the position at which the displacement of the vibrating body in the axial direction is about 90% of the vibrational displacement in the axial direction at the position of the first node. The one-dot chain line D shows the position at which the displacement of the vibrating body in the axial direction is about 40% of the vibrational displacement in the axial direction at the position of the first node. The two-dot chain line E shows the displacement of the bottom portion of the support when the connector is located at the position of the first node. The two-dot chain line F shows the displacement of the bottom portion of the support when the connector is located at the position shown by the one-dot chain line D.

As is clear from FIG. 7, when the connector 14 is located at the position shown by the one-dot chain line C, the displacement of the bottom portion 15b of the support 15 is able to be more reliably reduced. Thus, leakage of the vibration to the bottom portion 15b is able to be more reliably reduced. In addition, when the connector 14 is located at the position shown by the one-dot chain line D, as shown by the two-dot chain line E and the two-dot chain line F, the displacement of the bottom portion 15b is about 50% of that when the connector 14 is located at the position of the first node N1. Thus, leakage of the vibration to the bottom portion 15b is able to be significantly reduced. When the connector 14 is located at the position at which the displacement in the axial direction is about 0 as in the present preferred embodiment, leakage of the vibration to the bottom portion 15b is able to be further significantly reduced.

As described above, the vibrational displacement in the axial direction is reduced in the region between the first node N1 and the second node N2. In addition, a position at which the vibrational displacement is 0 exists between the first node N1 and the second node N2. These apply irrespective of the distance between the first node N1 and the second node N2 as described below. In this specification, the term "inter-node distance" means the distance between the first node N1 and the second node N2 unless specified otherwise.

A plurality of vibrating elements having inter-node distances different from that in the first preferred embodiment were prepared. More specifically, when the inter-node distance is L in the first preferred embodiment, vibrating elements having inter-node distances of L+1 mm, L−0.5 mm, and L+20 mm were prepared. The inter-node distance was changed by changing the length of the joining portion of the vibrating body in the axial direction. Then, the vibrational displacement of each vibrating element was measured.

Figure 8:
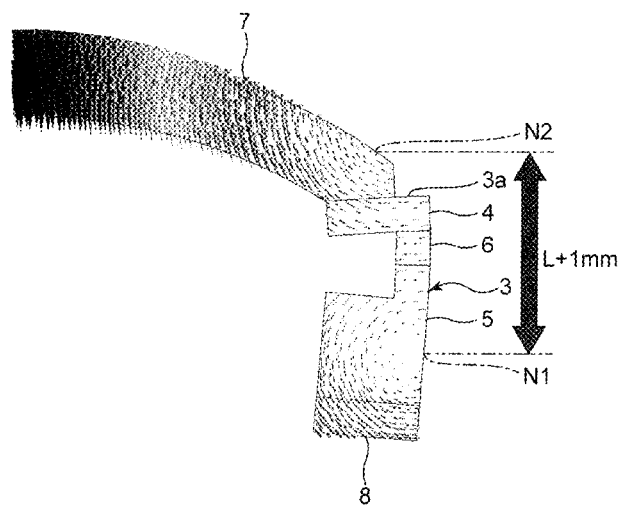
FIG. 8 is an element vector diagram of a vibrating element with an inter-node distance of L+1 mm.
Figure 9:
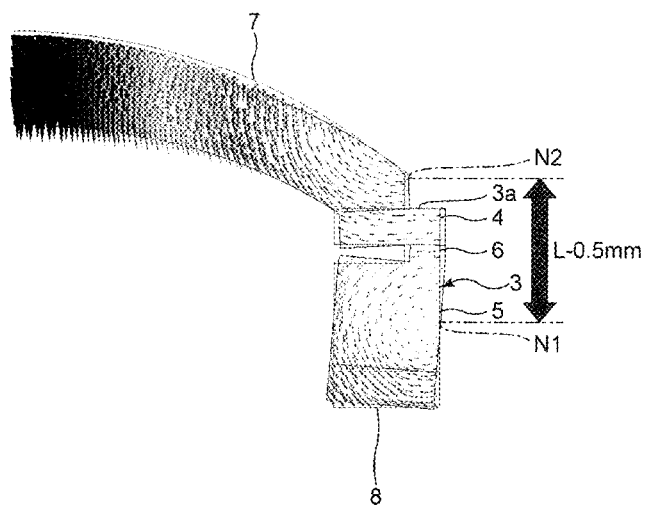
FIG. 9 is an element vector diagram of a vibrating element with an inter-node distance of L−0.5 mm.
Figure 10:
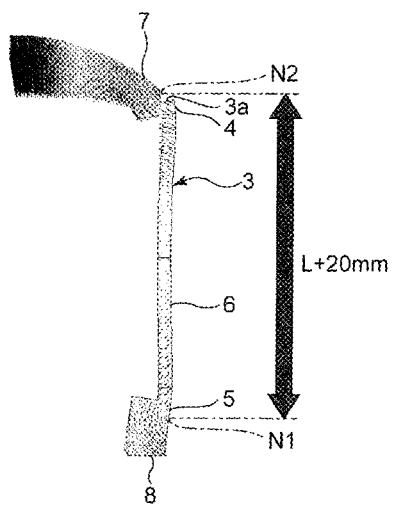
FIG. 10 is an element vector diagram of a vibrating element with an inter-node distance of L+20 mm.

FIG. 8 is an element vector diagram of the vibrating element with the inter-node distance of L+1 mm. FIG. 9 is an element vector diagram of the vibrating element with the inter-node distance of L−0.5 mm. FIG. 10 is an element vector diagram of the vibrating element with the inter-node distance of L+20 mm.

As is clear from FIGS. 8 to 10, even when the inter-node distance is changed, the first node N1 is on the vibrating body 3 and the second node N2 is on the light transmitting body 7. This shows that, irrespective of the inter-node distance, the vibrational displacement of the light transmitting body 7 is greater than the vibrational displacement of a portion of the vibrating body 3 between the first opening end surface 3a and the first node N1. This is because the displacement caused when the light transmitting body is excited in the resonance region is expressed as the product of the displacement of the vibrating body and Qm of the light transmitting body. Here, Qm is the reciprocal of the elastic loss factor. More specifically, when the vibration generated by the piezoelectric vibrator is transmitted to the vibrating body and when the vibrating body vibrates at a resonant frequency, the vibrational displacement generated by the piezoelectric vibrator is multiplied by a factor of Qm of the vibrating body. When the amplitude of the vibration generated by the piezoelectric vibrator is 1 and Qm of the vibrating body is $Qm_1$, the amplitude of the vibrating body in the natural vibration mode is $1 \times Qm_1$. When the vibration generated by the piezoelectric vibrator is transmitted to the light transmitting body through the vibrating body and when the light transmitting body vibrates at a resonant frequency, the vibrational displacement generated by the piezoelectric vibrator is additionally multiplied by a factor of Qm of the light transmitting body. When Qm of the light transmitting body is $Qm_2$, the amplitude of the light transmitting body in the natural vibration mode is $1 \times Qm_1 \times Qm_2$. Therefore, the vibrational displacement of the vibrating body is less than the vibrational displacement of the light transmitting body during resonance. The above-described relationship is satisfied irrespective of the material of the lid body that defines and functions as the light transmitting body or that has no light-transmitting property.

Figure 11:
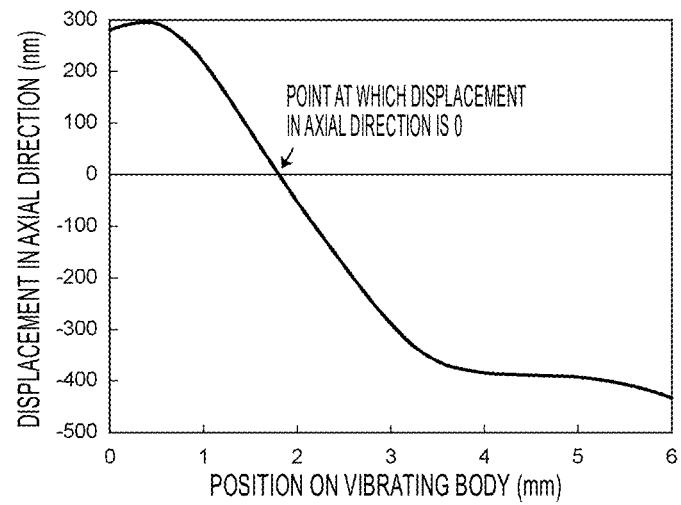
FIG. 11 is a graph showing the vibrational displacement in the axial direction at each position on the vibrating body when the inter-node distance is L+1 mm.
Figure 12:
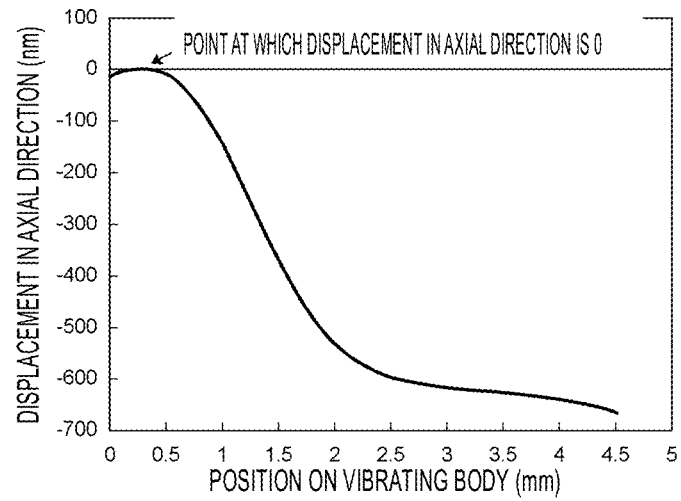
FIG. 12 is a graph showing the vibrational displacement in the axial direction at each position on the vibrating body when the inter-node distance is L−0.5 mm.
Figure 13:
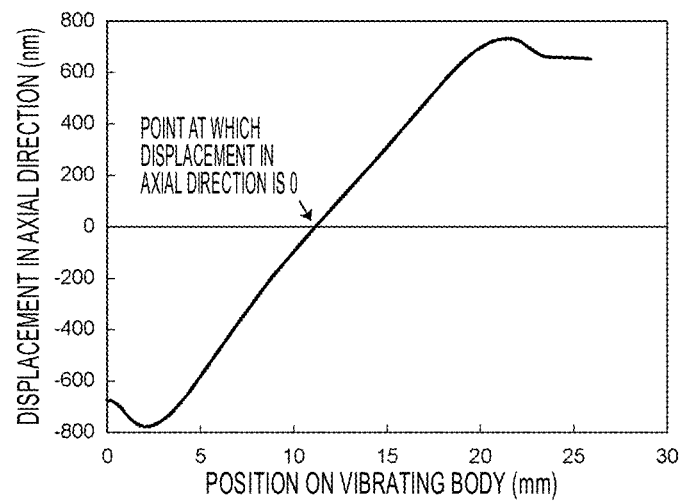
FIG. 13 is a graph showing the vibrational displacement in the axial direction at each position on the vibrating body when the inter-node distance is L+20 mm.

FIG. 11 is a graph showing the vibrational displacement in the axial direction at each position on the vibrating body when the inter-node distance is L+1 mm. FIG. 12 is a graph showing the vibrational displacement in the axial direction at each position on the vibrating body when the inter-node distance is L−0.5 mm. FIG. 13 is a graph showing the vibrational displacement in the axial direction at each position on the vibrating body when the inter-node distance is L+20 mm. In FIGS. 11 to 13, the value 0 mm on the horizontal axis represents the position of the first opening end surface of the vibrating body.

FIG. 11 shows that, similar to the first preferred embodiment, also when the inter-node distance is L+1 mm, the position at which the vibrational displacement in the axial direction is 0 exists between the first node N1 and the second node N2. As the position on the vibrating body 3, which is represented by the horizontal axis, approaches the position at which the vibrational displacement in the axial direction is 0, the vibrational displacement in the axial direction approaches 0. This shows that the vibrational displacement in the axial direction is small in a region between the first opening end surface 3a, at which the value on the horizontal axis is 0 mm, and the first node N1. Similarly, FIGS. 12 and 13 show that, also when the inter-node distance is L−0.5 mm and L+20 mm, the position at which the vibrational displacement in the axial direction is 0 exists between the first node N1 and the second node N2. In addition, the displacement in the axial direction is small in the region between the first node N1 and the second node N2. Thus, irrespective of the inter-node distance, the position at which the vibrational displacement in the axial direction is 0 exists between the first node N1 and the second node N2, and the displacement in the axial direction is small in the region between the first opening end surface 3a and the first node N1.

In addition, as described above, the displacement of the light transmitting body 7 on which the second node N2 exists is greater than the vibrational displacement in the region between the first opening end surface 3a of the vibrating body 3 and the first node N1. Therefore, the displacement in the axial direction is small in the region between the first node N1 and the second node N2 irrespective of the inter-node distance.

Referring to FIG. 1 again, the material of the support is, for example, preferably a material having spring characteristics, such as a metal material. In this case, the support 15 is able to be easily deformed. Accordingly, when the vibration of the vibrating element 2 is transmitted to the support 15 through the connector 14, a portion of the support 15 around the connecting portion 15a is able to be easily deformed. Therefore, displacement of the support 15 as a whole is able to be significantly reduced, and displacement of the bottom portion 15b of the support 15 is able to be significantly reduced accordingly. Thus, leakage of the vibration to the bottom portion 15b is able to be significantly reduced, and damping of the vibration is also able to be significantly reduced. In addition, when the material of the support 15 is a metal material, the rigidity of the support 15 is able to be significantly increased. Therefore, not only are the above-described features and advantages able to be achieved, the risk of breakage is able to be significantly reduced. When the vibrating body 3 includes a metal material, an insulating film is preferably provided between the piezoelectric vibrator 8 and the vibrating body 3, for example.

The vibrating body 3, the connector 14, and the support 15 preferably include the same material, for example. In this case, reflection of the vibration is able to be significantly reduced, and vibration of the vibrating device 1 is not easily attenuated. More preferably, the vibrating body 3, the connector 14, and the support 15 include a metal material, for example. Accordingly, as described above, leakage and damping of the vibration is able to be significantly reduced. The vibrating body 3, the connector 14, and the support 15 may instead include a ceramic material.

First to third modifications of the first preferred embodiment will now be described. According to the first to third modifications, similar to the first preferred embodiment, leakage and damping of the vibration are able to be significantly reduced.

Figure 14:
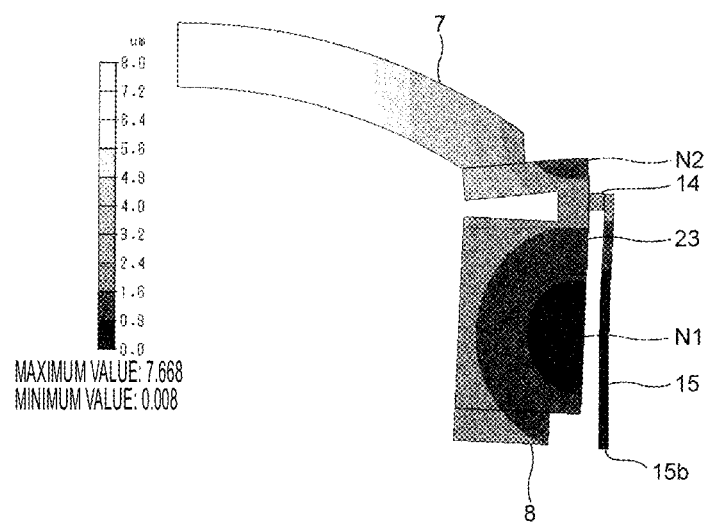
FIG. 14 illustrates vibration of a vibrating device according to a first modification of the first preferred embodiment of the present invention.

In the first modification illustrated in FIG. 14, both the first node N1 and the second node N2 are positioned on the vibrating body 3, and the connector 14 is positioned between the first node N1 and the second node N2.

Figure 15:
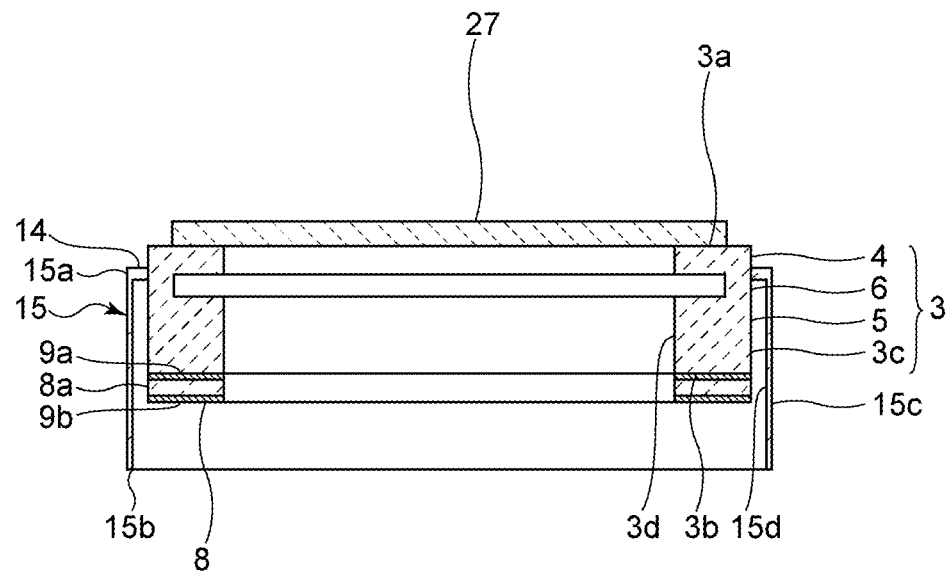
FIG. 15 is an elevational cross-sectional view of a vibrating device according to a second modification of the first preferred embodiment of the present invention.

In the second modification illustrated in FIG. 15, a lid body 27 with a disc shape and having no light-transmitting property is provided on the first opening end surface 3a of the vibrating body 3. The lid body 27 includes, for example, a metal material or a ceramic material. The vibrating device of this modification may be applied, for example, to generate sound pressure in an ultrasonic wave sensor, a microphone, a buzzer, or the like.

Figure 16:
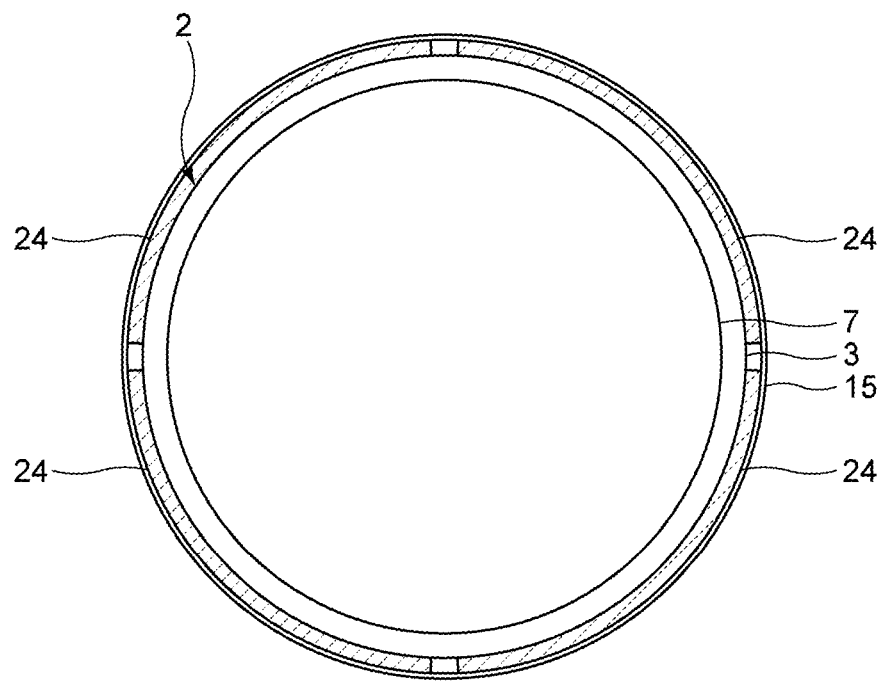
FIG. 16 is a plan view of a vibrating device according to a third modification of the first preferred embodiment of the present invention.

In the third modification illustrated in FIG. 16, the vibrating body 3 and the support 15 are connected to each other by a plurality of connectors 24 that are located with gaps therebetween in a circumferential direction around a rotational axis extending in the axial direction. In FIG. 16, the connectors 24 are shown by cross-hatching. Each connector 24 has the shape of an arc of a circular ring. Similar to the first preferred embodiment, the connectors 24 are positioned between the first node N1 and the second node N2.

Figure 17:
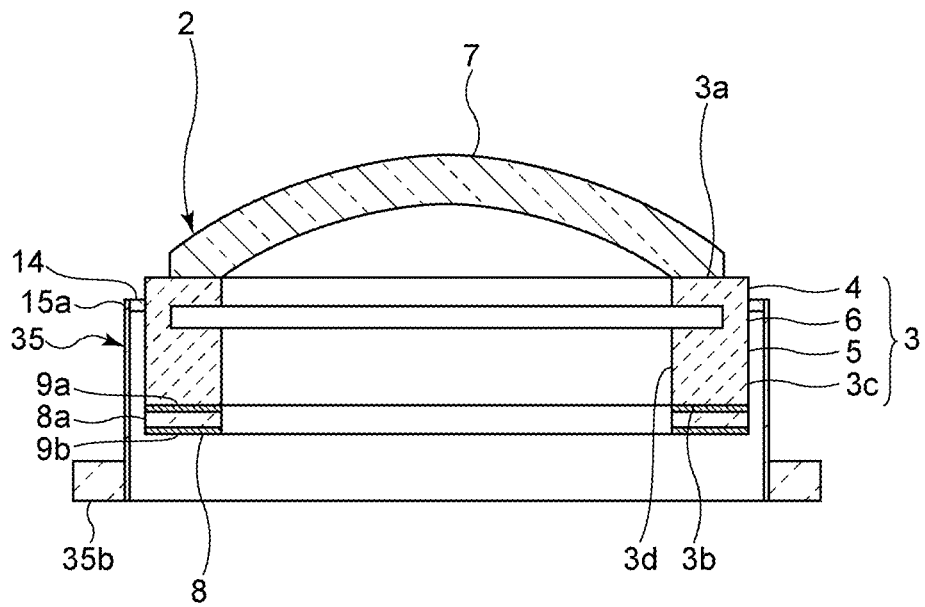
FIG. 17 is an elevational cross-sectional view of a vibrating device according to a second preferred embodiment of the present invention.

FIG. 17 is an elevational cross-sectional view of a vibrating device according to a second preferred embodiment of the present invention.

This preferred embodiment differs from the first preferred embodiment in that a bottom portion 35b of a support 35 has a wall thickness greater than the wall thickness of other portions. More specifically, portions of the support 35 other than the bottom portion 35b have the same or substantially the same wall thickness. The bottom portion 35b extends radially outward, and the support 35 has a substantially L shape in cross section along the axial direction. Other structures of the vibrating device of the present preferred embodiment are the same as or similar to those of the vibrating device 1 according to the first preferred embodiment.

Since the wall thickness of portions of the support 35 other than the bottom portion 35b is less than the wall thickness of the bottom portion 35b, a portion that is closer to the connecting portion 15a than the bottom portion 35b is more easily deformed than the bottom portion 35b. Accordingly, when the vibration of the vibrating element 2 is transmitted to the support 35 through the connector 14, the portion that is closer to the connecting portion 15a than the bottom portion 35b is more easily deformed than the bottom portion 35b. Therefore, displacement of the support 35 as a whole is able to be further significantly reduced. In addition, since the bottom portion 35b has a large wall thickness, displacement of the bottom portion 35b is able to be further significantly reduced. Therefore, leakage of the vibration to the bottom portion 35b is able to be further significantly reduced, and damping of the vibration is able to also be further significantly reduced.

Figure 18:
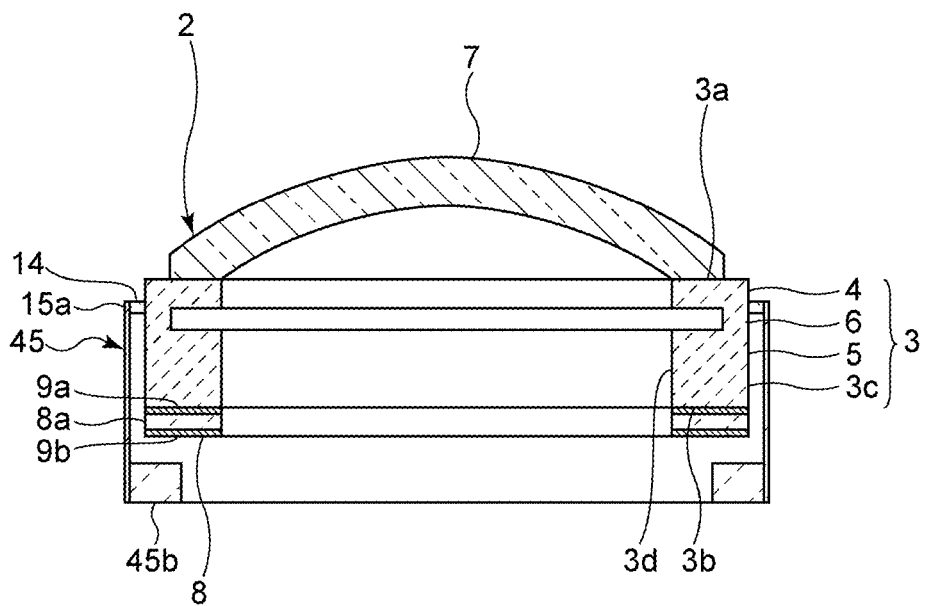
FIG. 18 is an elevational cross-sectional view of a vibrating device according to a modification of the second preferred embodiment of the present invention.

The direction in which the bottom portion 35b of the support 35 extends is not limited to the radially outward direction. In a modification of the second preferred embodiment illustrated in FIG. 18, a bottom portion 45b of a support 45 extends radially inward, and the support 45 has a substantially L shape in cross section along the axial direction. Also in this case, leakage and damping of the vibration are able to be further significantly reduced. In addition, the size of the vibrating device is able to be significantly reduced.

Figure 19:
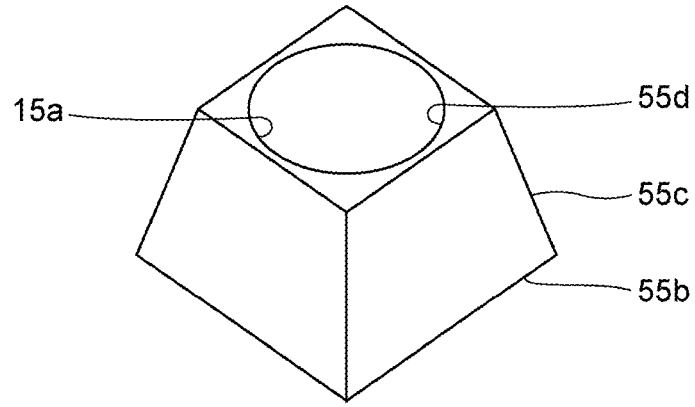
FIG. 19 is a perspective view of a support according to a third preferred embodiment of the present invention.

FIG. 19 is a perspective view of a support according to a third preferred embodiment of the present invention.

This preferred embodiment differs from the first preferred embodiment in that a support 55 has a substantially rectangular tubular shape and that an outer surface 55c of the support 55 is inclined with respect to the axial direction. Other structures of a vibrating device of this preferred embodiment are the same as or similar to those of the vibrating device 1 according to the first preferred embodiment.

The outer periphery of the support 55 has a square shape in plan view. The outer surface 55c of the support 55 has a shape defined by connecting four trapezoid surfaces. The support 55 has an inner surface 55d having a cylindrical or substantially cylindrical shape as in the first preferred embodiment.

The outer surface 55c of the support 55 is inclined with respect to the axial direction, and the wall thickness decreases with increasing distance from the bottom portion 55b toward the connecting portion 15a. Accordingly, a portion that is closer to the connecting portion 15a than the bottom portion 55b is more easily deformed than the bottom portion 55b. Therefore, similar to the second preferred embodiment, leakage of the vibration to the bottom portion 55b of the support 55 is able to be significantly reduced, and damping of the vibration is also able to be significantly reduced. The shape of the outer periphery of the support 55 in plan view may instead be, for example, a polygonal shape other than a square shape, a substantially polygonal shape, a circular shape, or a substantially circular shape.

Although the outer surface 55c of the support 55 is inclined with respect to the axial direction in the present preferred embodiment, the outer surface 55c may instead have a shape with steps and the wall thickness may decrease with increasing distance from the bottom portion 55b to the connecting portion 15a. Also in this case, leakage and damping of the vibration are able to be significantly reduced.

Figure 20:
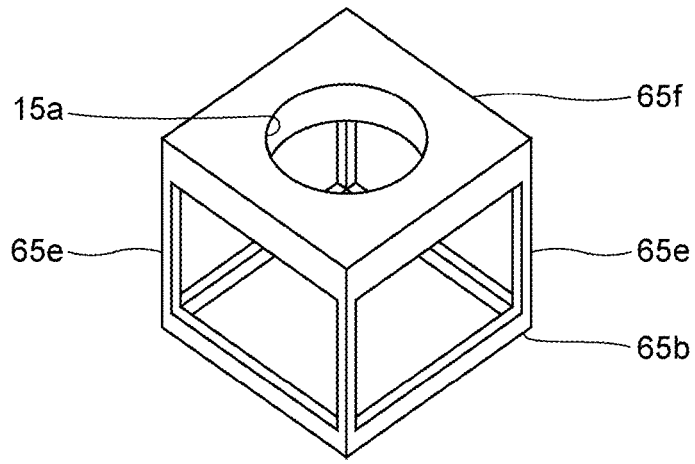
FIG. 20 is a perspective view of a support according to a fourth preferred embodiment of the present invention.

FIG. 20 is a perspective view of a support according to a fourth preferred embodiment of the present invention.

In this preferred embodiment, a support 65 has a shape that differs from that in the first preferred embodiment. Other structures of a vibrating device of the present preferred embodiment are the same as or similar to those of the vibrating device 1 according to the first preferred embodiment.

More specifically, the support 65 includes a frame-shaped bottom portion 65b having a square inner periphery and a square outer periphery. One end of a pillar portion 65e is connected to each corner of the bottom portion 65b. The pillar portions 65e extend in the axial direction. In the present preferred embodiment, the support 65 is structured with the pillar portions 65e having a constant or substantially constant wall thickness, which is equal or substantially equal to the wall thickness of the bottom portion 65b. The other end of each pillar portion 65e is connected to a frame-shaped portion 65f. More specifically, the frame-shaped portion 65f has a square outer periphery and a circular inner periphery. Each pillar portion 65e is connected to one of the corners of the frame-shaped portion 65f. The inner periphery of the frame-shaped portion 65f defines and functions as the connecting portion 15a connected to the above-described connector 14.

According to the structure of the support 65, the pillar portions 65e are more easily deformed in a direction orthogonal or substantially orthogonal to the axial direction than the frame-shaped bottom portion 65b. Therefore, similar to the second preferred embodiment, leakage of the vibration to the bottom portion 65b of the support 65 is able to be significantly reduced, and damping of the vibration is also able to be significantly reduced. The shape of the outer periphery of the bottom portion 65b and the frame-shaped portion 65f in plan view may instead be, for example, a polygonal shape other than a square shape, a substantially polygonal shape, a circular shape, or a substantially circular shape.

Figure 21:
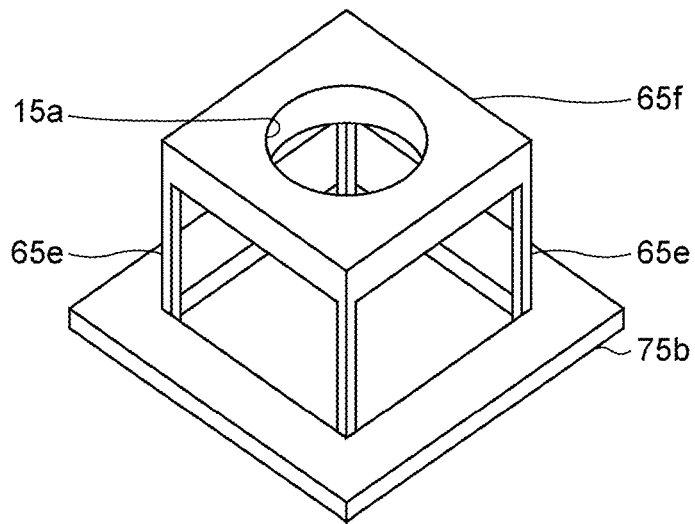
FIG. 21 is a perspective view of a support according to a first modification of the fourth preferred embodiment of the present invention.

The pillar portions 65e and the bottom portion 65b of the support 65 do not necessarily have the same or substantially the same wall thickness. A support 75 according to a first modification of the fourth preferred embodiment illustrated in FIG. 21 includes a bottom portion 75b having a wall thickness greater than the wall thickness of the pillar portions 65e. Accordingly, displacement of the bottom portion 75b is able to be further significantly reduced. Therefore, leakage of the vibration to the bottom portion 75b is able to be further significantly reduced, and damping of the vibration is also able to be further significantly reduced. Although the bottom portion 75b extends outward in the direction orthogonal or substantially orthogonal to the axial direction in this modification, the bottom portion 75b may instead extend inward in the direction orthogonal or substantially orthogonal to the axial direction.

Figure 22:
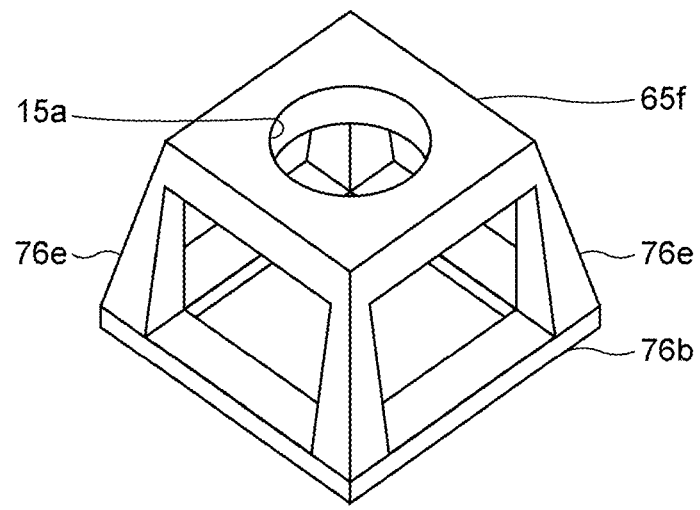
FIG. 22 is a perspective view of a support according to a second modification of the fourth preferred embodiment of the present invention.

Although the pillar portions 65e of the support 65 illustrated in FIG. 20 have a constant or substantially constant wall thickness, the pillar portions 65e are not limited to this. In a second modification of the fourth preferred embodiment illustrated in FIG. 22, pillar portions 76e of a support 76 are substantially right triangular in cross section along the axial direction. The wall thickness of each pillar portion 76e decreases with increasing distance from the bottom portion 76b toward the connecting portion 15a. Accordingly, portions that are closer to the connecting portion 15a than the bottom portion 76b are more easily deformed than the bottom portion 76b. Therefore, similar to the third preferred embodiment, leakage of the vibration to the bottom portion 76b of the support 76 is able to be significantly reduced, and damping of the vibration is also able to be significantly reduced.

Figure 23:
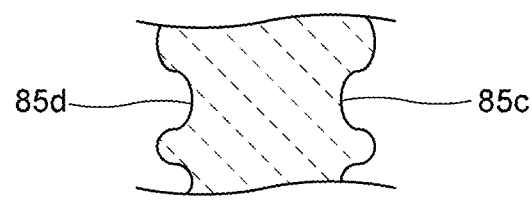
FIG. 23 is an elevational cross-sectional view of a portion of a support according to a fifth preferred embodiment of the present invention.

FIG. 23 is an elevational cross-sectional view of a portion of a support according to a fifth preferred embodiment of the present invention.

This preferred embodiment differs from the first preferred embodiment in that an outer surface 85c and an inner surface 85d of a support 85 has a wave shape. Other structures of a vibrating device of the present preferred embodiment are the same or similar to as those of the vibrating device 1 according to the first preferred embodiment.

The outer surface 85c and the inner surface 85d of the support 85 are curved and have a wave shape. More specifically, the outer surface 85c has a wave shape with the outer diameter thereof repeatedly increases with increasing distance from the bottom portion toward the connecting portion and then decreases with increasing distance from the bottom portion toward the connecting portion. The inner surface 85d has a wave shape with the inner diameter thereof repeatedly increases with increasing distance from the bottom portion toward the connecting portion and then decreases with increasing distance from the bottom portion toward the connecting portion. The support 85 is shaped with the wall thickness thereof repeatedly increasing with increasing distance from the bottom portion toward the connecting portion and then decreases with increasing distance from the bottom portion toward the connecting portion.

Since the outer surface 85c and the inner surface 85d of the support 85 have wave shapes, the spring characteristics of a portion of the support 85 that is closer to the connecting portion than the bottom portion are able to be significantly improved. Therefore, displacement of the support 85 as a whole is able to be significantly reduced, and displacement of the bottom portion of the support 85 is able to be significantly reduced accordingly. Thus, leakage of the vibration to the bottom portion is able to be significantly reduced, and damping of the vibration is also able to be significantly reduced.

Portions of the outer surface 85c of the support 85 at which the outer diameter of the support 85 starts to decrease after increasing with increasing distance from the bottom portion toward the connecting portion are referred to as crests. Portions at which the outer diameter starts to increase after decreasing with increasing distance from the bottom portion toward the connecting portion are referred to as troughs. Portions of the inner surface 85d of the support 85 at which the inner diameter of the support 85 starts to increase after decreasing with increasing distance from the bottom portion toward the connecting portion are referred to as crests. Portions at which the inner diameter starts to decrease after increasing with increasing distance from the bottom portion toward the connecting portion are referred to as troughs. The crests of the outer surface 85c and the crests of the inner surface 85d are preferably at the same or substantially the same positions in the axial direction, for example. Similarly, the troughs of the outer surface 85c and the troughs of the inner surface 85d are preferably at the same or substantially the same positions in the axial direction, for example. Accordingly, the spring characteristics of the support 85 are able to be significantly improved.

The shape of the support 85 in cross section along the axial direction is preferably line-symmetric or substantially line-symmetric about a symmetry axis that extends in the axial direction, for example. Accordingly, the spring characteristics are able to be significantly improved.

The outer surface 85c and the inner surface 85d of the support 85 may be linear and may have wave shapes. Also in this case, the spring characteristics are able to be significantly improved, and leakage and damping of the vibration are able to be significantly reduced.

Figure 24:
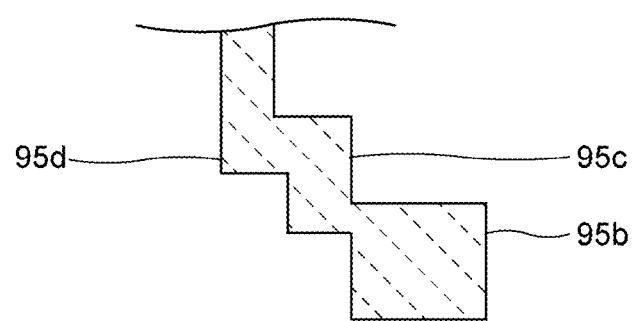
FIG. 24 is an elevational cross-sectional view of a portion of a support according to a sixth preferred embodiment of the present invention.

FIG. 24 is an elevational cross-sectional view of a portion of a support according to a sixth preferred embodiment of the present invention.

This preferred embodiment differs from the second preferred embodiment in that an outer surface 95c and an inner surface 95d of a support 95 both have step shapes. Other structures of a vibrating device of the present preferred embodiment are the same as or similar to those of the vibrating device according to the second preferred embodiment.

The support 95 is bent at a plurality of portions in the shape of steps. More specifically, the support 95 includes portions extending in the axial direction and portions extending in the radial direction that are alternately connected. Accordingly, the spring characteristics of the support 95 are able to be significantly improved. Therefore, similar to the fifth preferred embodiment, leakage and damping of the vibration are able to be significantly reduced.

In addition, the support 95 is structured with the wall thickness of the bottom portion 95b being greater than the wall thickness of the portions extending in the axial direction. Accordingly, similar to the second preferred embodiment, displacement of the bottom portion 95b is able to be further significantly reduced. Therefore, leakage of the vibration to the bottom portion 95b is able to be further significantly reduced, and damping of the vibration is also able to be further significantly reduced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibrating device comprising:
   a vibrating element including a vibrating body that is tubular and includes a first opening end surface and a second opening end surface;
   a support that extends in an axial direction and supports the vibrating body, the axial direction being a direction connecting the first opening end surface and the second opening end surface of the vibrating body; and
   a connector that connects the vibrating body and the support to each other; wherein
   the vibrating body vibrates in a breathing vibration mode to generate a first node and a second node on the vibrating element at different positions in the axial direction; and
   the connector is positioned between the first node and the second node.

2. The vibrating device according to claim 1, wherein
   the first node is positioned on the vibrating body; and
   a vibrational displacement of the vibrating body in the axial direction at a position at which the connector is connected is less than or equal to about 40% of a vibrational displacement of the vibrating body in the axial direction at a position of the first node.

3. The vibrating device according to claim 1, wherein the vibrating element includes a piezoelectric vibrator that vibrates the vibrating body.

4. The vibrating device according to claim 1, wherein
   the support includes a connecting portion connected to the connector and a bottom portion; and
   a portion of the support that is closer to the connecting portion than the bottom portion is more easily deformed than the bottom portion.

5. The vibrating device according to claim 4, wherein a wall thickness is a thickness in a direction orthogonal or substantially orthogonal to the axial direction, and the bottom portion of the support has a wall thickness greater than a wall thickness of other portions, and the support has an L-shape or a substantially L shape in cross section along the axial direction.

6. The vibrating device according to claim 1, wherein each of the vibrating body, the connector, and the support includes a same or substantially same material.

7. The vibrating device according to claim 6, wherein each of the vibrating body, the connector, and the support includes a metal material.

8. The vibrating device according to claim 1, wherein the vibrating element includes a lid body on the first opening end surface of the vibrating body.

9. The vibrating device according to claim 8, wherein the lid body has a light-transmitting property.

10. An optical detection apparatus comprising:
    the vibrating device according to claim 9; and
    an optical detection element; wherein
    the lid body of the vibrating device covers a detection region of the optical detection element.

11. The optical detection apparatus according to claim 10, wherein the optical detection element is an image pickup device, and the detection region is a field of view.

12. The vibrating device according to claim 1, wherein the vibrating device includes an interior space defined by the vibrating element, the support, and the connector.

13. The vibrating device according to claim 12, further comprising:
    a bottom plate joined to the support; wherein
    the interior space is a sealed space defined by the vibrating element, the support, the connector, and the bottom plate.

14. The optical detection apparatus according to claim 10, wherein the optical detection element optically detects electromagnetic waves or infrared rays.

15. The vibrating device according to claim 1, wherein the vibrating body includes a cylindrical or substantially cylindrical first vibrating portion, a cylindrical or substantially cylindrical second vibrating portion, and an annular joining portion that connects the first vibrating portion and the second vibrating portion.

16. The vibrating device according to claim 15, wherein, in the axial direction, a wall thickness of the annular joining portion is less than a wall thickness of each of the first and second vibrating portions.

17. The vibrating device according to claim 8, wherein the lid body has a dome shape.

18. The vibrating device according to claim 3, wherein the piezoelectric vibrator includes an electrode joined to the vibrating body.

* * * * *